United States Patent
Marathe et al.

(10) Patent No.: US 12,530,488 B2
(45) Date of Patent: Jan. 20, 2026

(54) USER-LEVEL PRIVACY PRESERVATION FOR FEDERATED MACHINE LEARNING

(71) Applicant: Oracle International Corporation, Redwood City, CA (US)

(72) Inventors: Virendra Marathe, Florence, MA (US); Pallika Haridas Kanani, Westford, MA (US); Daniel Peterson, Broomfield, CO (US); Swetasudha Panda, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 341 days.

(21) Appl. No.: 17/663,008

(22) Filed: May 11, 2022

(65) Prior Publication Data

US 2023/0047092 A1 Feb. 16, 2023

Related U.S. Application Data

(60) Provisional application No. 63/227,838, filed on Jul. 30, 2021.

(51) Int. Cl.
*G06N 20/00* (2019.01)
*G06F 21/62* (2013.01)

(52) U.S. Cl.
CPC ......... *G06F 21/6245* (2013.01); *G06N 20/00* (2019.01)

(58) Field of Classification Search
CPC ..... G06F 21/6245; G06N 20/00; G06N 3/098
See application file for complete search history.

(56) References Cited

U.S. PATENT DOCUMENTS

| | | | | |
|---|---|---|---|---|
| 10,402,469 | B2* | 9/2019 | McMahan | G06F 17/17 |
| 12,008,125 | B2* | 6/2024 | L?cuyer | G06F 21/552 |
| 12,072,954 | B1* | 8/2024 | Li | G06F 18/2148 |
| 12,118,119 | B2* | 10/2024 | Tran | G06F 21/6245 |

(Continued)

OTHER PUBLICATIONS

Shiva Prasad Kasiviswanathan, et al., "What Can We Learn Privately?", arXiv:0803.0924v3, Feb. 19, 2010, pp. 1-35.

(Continued)

*Primary Examiner* — Lynn D Feild
*Assistant Examiner* — Vladimir I Gavrilenko
(74) *Attorney, Agent, or Firm* — Robert C. Kowert; Kowert, Hood, Munyon, Rankin & Goetzel, P.C.

(57) ABSTRACT

User-level privacy preservation is implemented within federated machine learning. An aggregation server may distribute a machine learning model to multiple users each including respective private datasets. Individual users may train the model using the local, private dataset to generate one or more parameter updates. Prior to sending the generated parameter updates to the aggregation server for incorporation into the machine learning model, a user may modify the parameter updates by applying respective noise values to individual ones of the parameter updates to ensure differential privacy for the dataset private to the user. The aggregation server may then receive the respective modified parameter updates from the multiple users and aggregate the updates into a single set of parameter updates to update the machine learning model. The federated machine learning may further include iteratively performing said sending, training, modifying, receiving, aggregating and updating steps.

20 Claims, 5 Drawing Sheets

(56) References Cited

U.S. PATENT DOCUMENTS

| | | | |
|---|---|---|---|
| 2021/0150269 A1 | 5/2021 | Choudhury et al. | |
| 2021/0158211 A1* | 5/2021 | Talwar | G06F 21/6245 |
| 2021/0216902 A1* | 7/2021 | Sutcher-Shepard | G06N 20/00 |
| 2022/0284232 A1* | 9/2022 | Yin | G06V 10/774 |
| 2023/0087863 A1* | 3/2023 | Gong | G06F 18/24133 |
| 2023/0413070 A1* | 12/2023 | Li | H04L 25/03343 |
| 2024/0330705 A1* | 10/2024 | Qi | G06N 3/0464 |

OTHER PUBLICATIONS

John C. Duchi, et al., "Local Privacy, Data Processing Inequalities, and Minimax Rates", arXiv:1302.3203V4, Aug. 27, 2014, pp. 1-59.

Martin Abadi, et al., "Deep Learning with Differential Privacy", arXiv:1607.00133v2, Oct. 24, 2016, pp. 1-14.

H. Brendan McMahan, et al., "Learning Differentially Private Recurrent Language Models", arXiv:1710.06963v3, Feb. 24, 2018, pp. 1-14.

Robin C. Geyer, et al., "Differentially Private Federated Learning: A Client Level Perspective", arXiv:1712.07557v2, Mar. 1, 2018, pp. 1-7.

Keith Bonawitz, et al., "Towards Federated Learning at Scale: System Design", arXiv:1902.01046v2, Mar. 22, 2019, pp. 1-15.

Stacey Truex, et al., "LDP-Fed: Federated Learning with Local Differential Privacy", arXiv:2006.03637v1, Jun. 5, 2020, pp. 1-6.

Cynthia Dwork, et al., "Calibrating Noise to Sensitivity in Private Data Analysis", In Theory of cryptography conference, Springer, pp. 265-284.

* cited by examiner

USER-LEVEL PRIVACY PRESERVATION FOR FEDERATED MACHINE LEARNING

This application claims benefit of priority of U.S. Provisional Patent Application No. 63/227,838, filed Jul. 30, 2021, which is hereby incorporated by reference herein in its entirety.

BACKGROUND

Field of the Disclosure

This disclosure relates generally to computer hardware and software, and more particularly to systems and methods for implementing federated machine learning systems.

Description of the Related Art

Federated Learning (FL) has increasingly become a preferred method for distributed collaborative machine learning (ML). In FL, multiple users collaboratively train a single global ML model using respective private data sets. These users, however, do not share data with other users. A typical implementation of FL may contain a federation server and multiple federation users, where the federation server hosts a global ML model and is responsible for distributing the model to the users and for aggregating model updates from the users.

The respective users train the received model using private data. While this data isolation is a first step toward ensuring data privacy, ML models are known to learn the training data itself and to leak that training data at inference time.

There exist methods based on Differential Privacy (DP) that ensure that individual data items are not learned by the FL trained model, however each user can expose its data distribution to the federation server even when privacy of individual data items is preserved. In order to protect the user's data distribution from a potentially adversarial federation server, the user must enact a DP enforcement mechanism.

SUMMARY

Methods, techniques and systems for implementing user-level privacy preservation within federated machine learning are disclosed. An aggregation server may distribute a machine learning model to multiple users each including respective private datasets. Individual users may train the model using the local, private dataset to generate one or more parameter updates. Prior to sending the generated parameter updates to the aggregation server for incorporation into the machine learning model, a user may modify the parameter updates by applying respective noise values to individual ones of the parameter updates to provide or ensure differential privacy for the dataset private to the user. The aggregation server may then receive the respective modified parameter updates from the multiple users and aggregate the updates into a single set of parameter updates to update the machine learning model.

Figure 1:
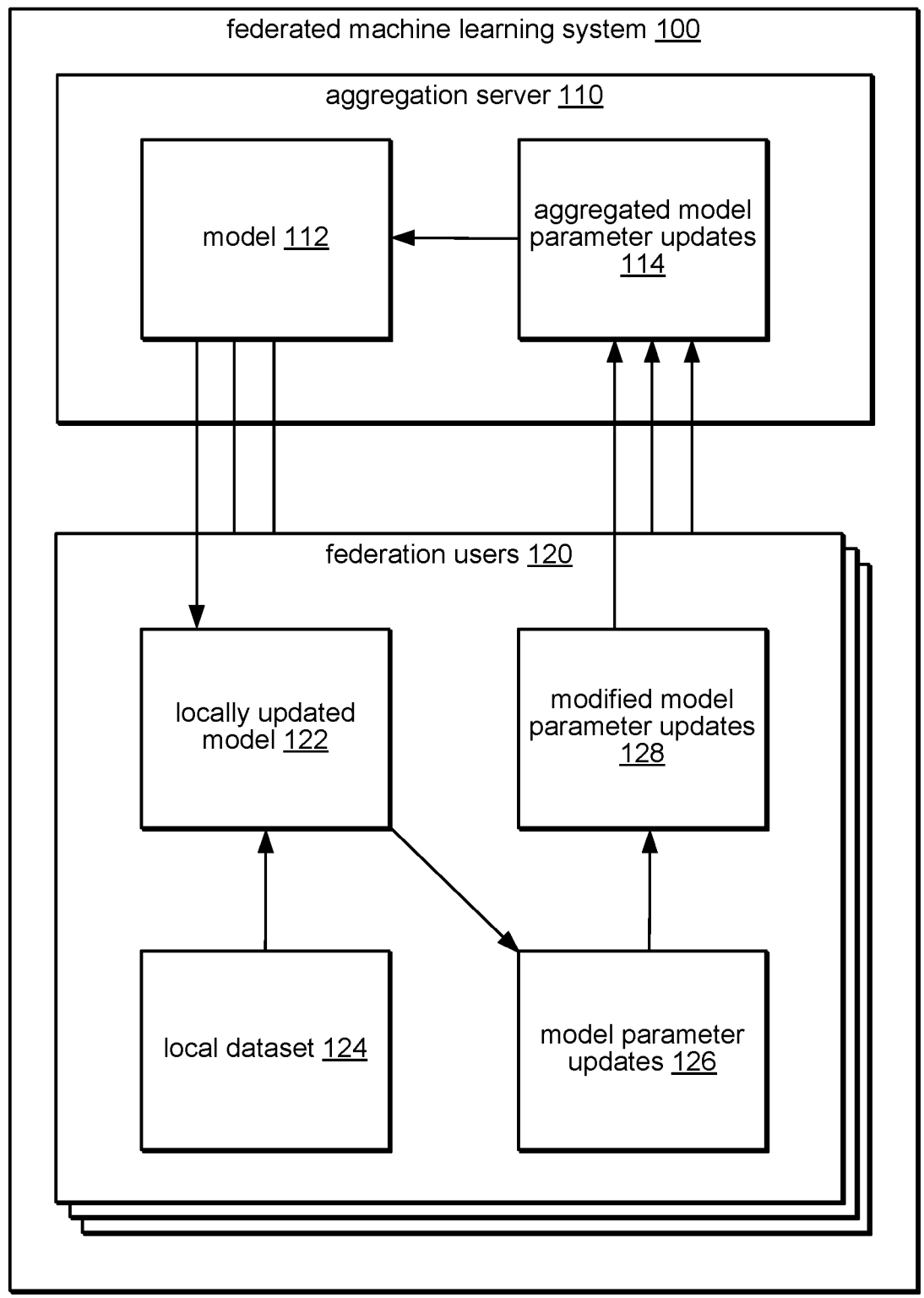
FIG. 1 is a block diagram illustrating a collaborative, federated machine learning system that enables multiple users to cooperatively train a Machine Learning (ML) model without sharing private training data, in various embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Federated Learning (FL) is a distributed collaborative machine learning paradigm that enables multiple users to cooperatively train a Machine Learning (ML) model without sharing private training data. A typical FL framework may contain a central federation server and numerous federation users connected to the server. The users train a common ML model using private training data and send resulting model updates to the server. The server may then aggregate incoming model updates, update the model and broadcast the updated model back to the users. This process may then repeat for a number of training rounds until the model converges or a fixed number of rounds is complete. FL leverages collective training data spread across all users to deliver better model performance while preserving the privacy of each user's training data by locally training the model at the user.

Using FL, the resulting model may expose information about the training data at inference time. Differential Privacy (DP), a provable privacy guarantee, may be added to FL to address this shortcoming. In ML model training, DP ensures that the impact of each individual training data item on the resulting ML model is bounded by a privacy loss parameter. A low enough privacy loss parameter guarantees that no adversary may determine the presence (or absence) of any data item in the training data. However, this privacy guarantee typically comes at the cost of lower model performance since it entails introduction of carefully calibrated noise in the training process.

With FL, privacy may be enforced at the granularity of each data item obfuscating use of each item in the aggregate training dataset (across all users). Privacy may also be enforced at the granularity of each user obfuscating the participation of each user in the training process. The former is termed item-level privacy and the latter user-level privacy.

It is often desirable to hide user participation in FL. With item-level DP, a user may still expose the distribution of its private training dataset. Since a user encloses its entire training dataset, the user-level privacy guarantee naturally extends itself to a form of group differential privacy for the entire dataset. Thus user-level DP may be considered a stronger privacy guarantee, providing protection of a user's entire dataset, as compared to item-level DP which may provide protection of individual data items at each user.

DP may be enforced either globally, by the federation server, or locally, by each user before sending model updates to the server. In the context of FL, the global enforcement may be termed global DP while local enforcement many be termed local DP. The preferred approach may be determined by assumptions made about the trust model between the federation server and its users. Global may be preferred in cases where the users trust the federation server, whereas local DP may be preferred in cases where there is a lack of trust between users and the federation server, or where lack of trust between users and the federation server must be assumed.

Differential Privacy (DP) Definition

DP bounds the maximum impact a single data item can have on the output of a randomized algorithm. A randomized algorithm $A: V \to R$ is said to be $(\varepsilon, \delta)$—differentially private if for any two adjacent datasets $D, D' \in V$, and set $S \subseteq R$, $$P(A(D) \in S) \le e^{\varepsilon} P(A(D') \in S) + \delta$$

where D, D' are adjacent to each other if they differ from each other by a single data item.

In ML model training, particularly for deep learning models, the impact of singular training data items may be constrained by gradient clipping and injection of carefully calibrated noise in the parameter updates.

In FL, in each training round, federation users may independently compute parameter updates in isolation using their private dataset. While carefully calibrated noise may be injected in the parameter updates, this noise injection is a distinct operation that may be decoupled from parameter update computation. The resulting two steps in parameter updates may be modeled based on Stochastic Gradient Descent (SGD):

$$\Theta = \Theta - \text{Clip}(\nabla L(y, \hat{y}), C) + N(0, \Box^2 C^2 I)$$

$\nabla L$ are the parameter gradients, and N is a normal distribution from which noise is added to the parameters $\theta$. Gradient clipping may be necessary to bound the sensitivity of parameter updates to the clipping threshold of C. $\Box$ may be calculated using methods such as the moments accountant method.

With the decoupling, noise injection may now be performed either at the user site, or at the federation server. Choice of the noise injection locale may be dictated by the trust model between the users and the federation server.

Four categories of DP, pertinent to FL, may be identified. These categories may be divided by the granularity of privacy (item-vs. user-level) and the locale of privacy enforcement (user-local vs. global). The categorization is largely relevant from the perspective of parameter updates observable by the federation server.

| Notation | Description |
| --- | --- |
| F | Federated training procedure for a single training round (user-local algorithm + aggregation at federation server) |
| M | Domain of parameter values for a given model architecture |
| $u_i$ | $i^{th}$ user in the federation |
| $A_i$ | Component of F executed locally at $i^{th}$ user $u_i$ |
| $D_i$ | Domain of dataset of $i^{th}$ user $u_i$ |
| U | Set of users in a federation |
| $D_U$ | Domain of aggregate dataset over all users ($D_U = U^n_{i=1} D_i$) |

Item-Level Global DP

A federation user that trusts the federation server may compute parameter updates and send them to the federation server. The bare parameter updates are visible to the server, and the federation server may take responsibility to enforce DP guarantees on the parameter updates received from each user. Since the DP guarantee extends to individual items and the server injects noise in the parameter updates, this approach may be identified as item-level global DP.

$F: (D_U, M) \to M$ enforces pooled item-level global $(\varepsilon, \delta)$—differential privacy if for any adjacent datasets $D, D' \in D_U$, model $M \in M$, and $S \subseteq M$, $$P(F(D, M) \in S) \le e^{\varepsilon} P(F(D', M) \in S) + \delta$$

F enforces item-level global $(\varepsilon, \delta)$—differential privacy if it enforces pooled item-level global $(\varepsilon, \delta)$-DP, with the constraint that $D, D' \in D_i$, for any user $u_i$ in the federation.

The item-level global DP guarantee of FL training may be extended to multiple rounds using established DP composition results. In each round, the federation server randomly may sample a subset of users and send them a request to compute parameter gradients over a mini-batch. Each user in turn may compute parameter gradients for each data item from a sampled local mini-batch, clip the gradients per a globally prescribed clipping threshold, average the gradients, and send back the averaged gradients to the federation server. The server may then add noise from a normal distribution, calculated using the moments accountant algorithm, to the gradients. The computation of the noise may use cardinality of the aggregate dataset across all participating users. The server may average the noisy gradients over all users sampled for the training round and then apply the gradients to the parameters.

Item-Level Local DP

An untrusting federation user may enforce DP guarantees locally on its parameter updates before sending them to the federation server. From the perspective of the federation server, noise injection by the user enforces item-level DP. This is sufficient to protect privacy of individual items in each user's private dataset, even from the federation server. This approach may be referred to as item-level local DP.

$A_i: (V_i, M) \to M$ is said to enforce item-level local $(\varepsilon,\delta)$ differential privacy if for any given user $u_i$, any adjacent datasets $D_i, D_i' \subseteq V_i$, model $M \in \mathbb{M}$, and $S \subseteq M$, $$P(A_i(D_i,M) \in S) \leq e^{\varepsilon} P(A_i(D_i',M) \in S) + \delta$$

The definition is scoped to an individual user which constrains the scope of datasets to individual users. This constraint may characterize the "local" aspect of the DP guarantee. Each user may enforce DP independent of all other users. Thus the privacy loss at each user may be independent of the privacy loss at every other user. From the perspective of the federation server, the received parameter updates may hide the contribution of each individual data item.

User-Level Global DP

User-level DP, also referred to as user-level global DP, may be enforced globally at the federation server.

$F: (U,M) \to M$ is user-level $(\varepsilon,\delta)$ differentially private if for any two adjacent user sets $U, U' \subseteq U$, $M \in \mathbb{M}$, and $S \subseteq M$, $$P(F(U,M) \in S) \leq e^{\varepsilon} P(F(U',M) \in S) + \delta$$

Given a user-level $(\varepsilon,\delta)$ differentially private FL training algorithm F, F is user-level global $(\varepsilon,\delta)$—differentially private if its privacy guarantee is enforced at the federation server.

User-Level Local DP

An untrusting federation user may enforce user-level privacy locally, known as user-level local $(\varepsilon,\delta)$—differential privacy. This level of privacy is stronger than user-level global DP in that the federation server cannot distinguish between signals coming from different users.

$F: (U,M) \to M$ is user-level local $(\varepsilon,\delta)$ differentially private if for any two users $u_1, u_2 \in U$, $M \in \mathbb{M}$, and $S \subseteq M$, $$P(F(u_1,M) \in S) \leq e^{\varepsilon} P(F(u_2,M) \in S) + \delta$$

The contribution of each user, though a result of training over multiple data items private to the user, is treated as a single, locally perturbed data item. The differences between the privacy guarantees may be observed differently from the vantage point of the federation server and an external observer that ends up using the fully trained model for inference. In the latter case, the difference between DP enforcement locales may be inconsequential to the observer. However, item- and user-level privacy remain distinct to the observer-item-level privacy may not be able to hide participation of a user with an outlier data distribution, particularly if the observer has access to auxiliary information about that user's distribution.

DP enforcement locales play a critical role in visibility of parameter updates to the federation server. Users may surrender their privacy to the federation server in global enforcement of DP. In local enforcement of DP, from the federation server's perspective, each user may enforce DP independently on its respective parameter updates. Item-level local DP ensures that the contribution of each data item is hidden from the federation server, whereas user-level local DP ensures that the entire signal coming from the user has enough noise to hide the user's data distribution from the federation server.

FIG. 1 is a block diagram illustrating a collaborative, federated machine learning system that enables multiple users to cooperatively train a Machine Learning (ML) model without sharing private training data, in various embodiments.

Figure 5:
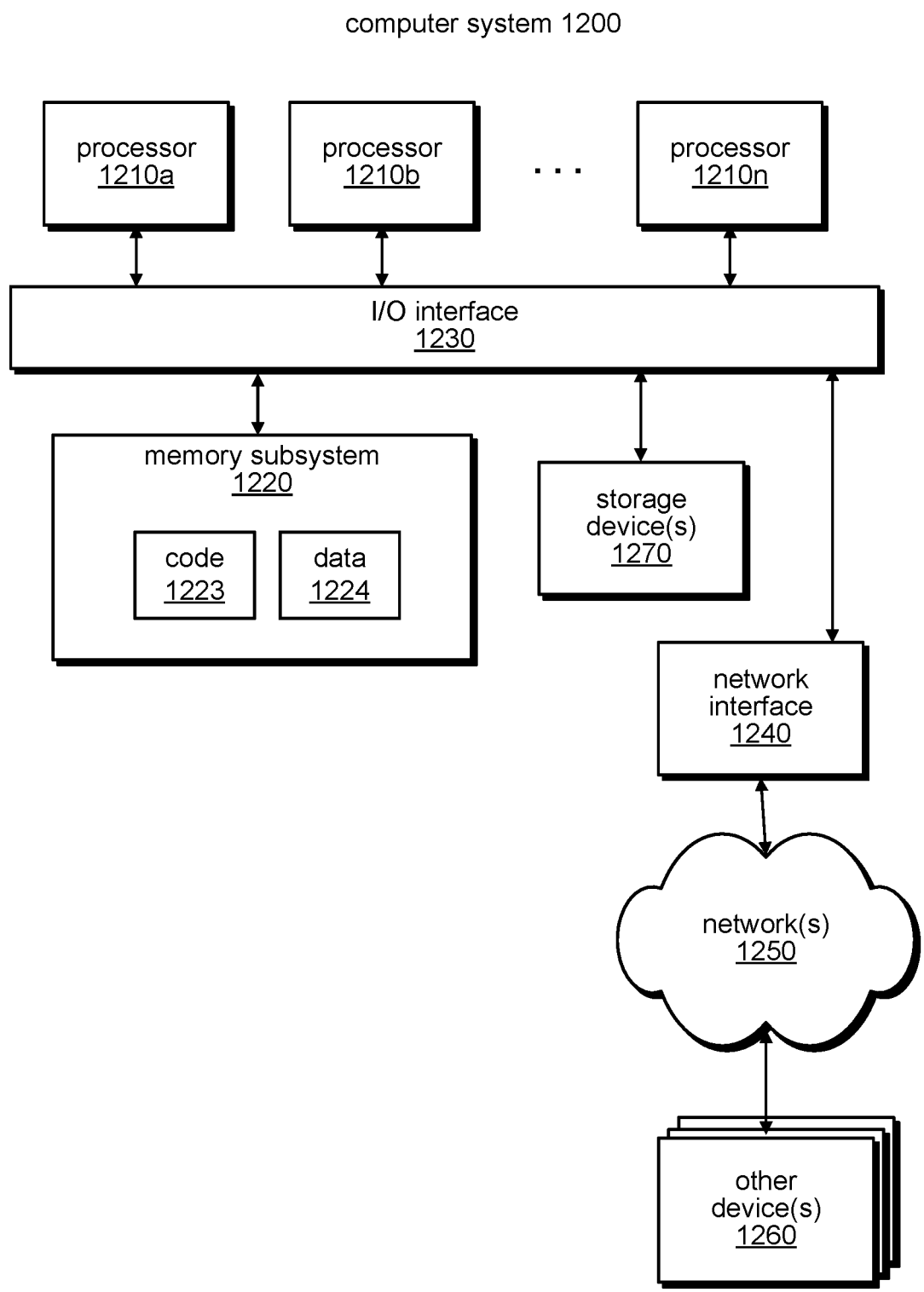
FIG. 5 is a block diagram illustrating one embodiment of a computing system that is configured to implement position-independent addressing modes, as described herein.

A federated machine learning system 100 may include a central aggregation server 110 and multiple federation users 120 that may employ local machine learning systems, in various embodiments. The respective server 110 and users 120 may be implemented, for example, by computer systems 1200 (or other electronic devices) as shown below in FIG. 5. The aggregation server 110 may maintain a machine learning model 112 and, to perform training, may distribute a current version of the machine learning model 112 to the federation users 120.

After receiving a current version of the machine learning model 112, individual ones of the federation users 120 may independently generate locally updated versions of the machine learning model 122 by training the model using local, private datasets 124. This independently performed training may then generate model parameter updates 126.

Individual ones of the federation users 120 may independently alter, by clipping and apply noise, to their local model parameter updates to generate modified model parameter updates 128, where the altering provides or ensures privacy of their local datasets 124. Once the modified model parameter updates 128 have been generated, the modified model parameter updates 128 may then be sent to the central aggregation server 110.

Upon receipt of the collective modified model parameter updates 128, the central aggregation server 110 may then aggregate the respective modified model parameter updates 128 to generate aggregated model parameter updates 114. The central aggregation server 110 may then apply the aggregated model parameter updates 114 to the current version of the model 112 to generate a new version of the model 112. This process may be repeated a number of times until the model 112 converges or until a predetermined threshold number of iterations is met.

Figure 2:
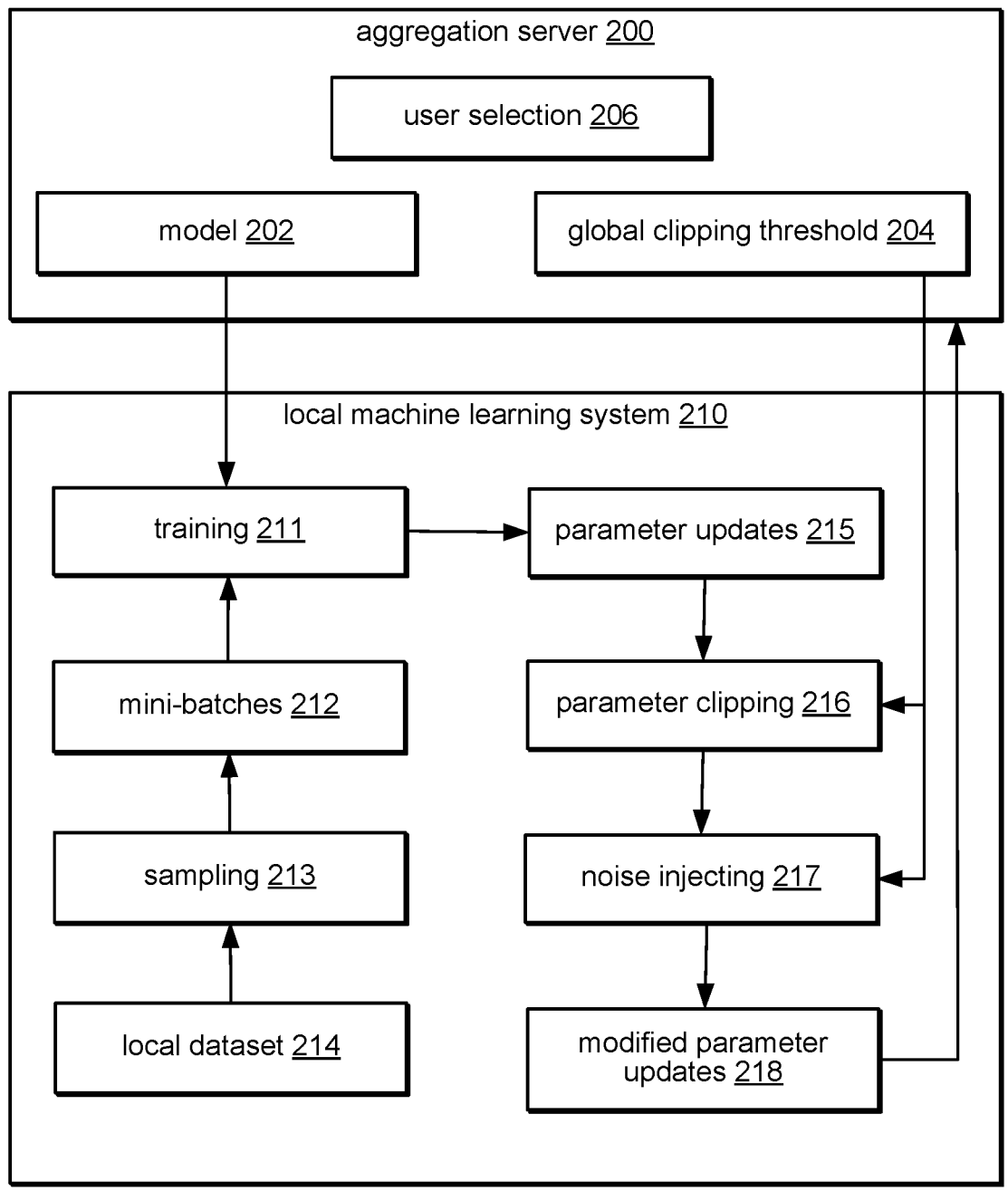
FIG. 2 is a block diagram illustrating a machine learning system that functions as a user of a collaborative, federated machine learning to cooperatively train a Machine Learning (ML) model without sharing private training data, in various embodiments.

FIG. 2 is a block diagram illustrating a local machine learning system that functions as a user of a collaborative, federated machine learning to cooperatively train a Machine Learning (ML) model without sharing private training data, in various embodiments. As shown in FIG. 2, a local machine learning system may function as a user of a federate machine learning system, such as a federation user 120 of a federated machine learning system 100 as shown in FIG. 1, by coordinating with an aggregation server 200, such as the aggregation server 110 as shown in FIG. 1. The aggregation server 200 and local machine learning system 210 may be implemented, for example, by computer systems 1200 (or other electronic devices) as shown below in FIG. 5.

The aggregation server 200 may provide a machine learning model 202, such as the model 112 of FIG. 1, and a global clipping threshold 204 to the local machine learning system 210 for training responsive to selecting the local machine learning system 210 to participate as a user in a particular training round using the user selection component 206 of the aggregation server 200. Federated machine learning systems may employ multiple training rounds in the training of a machine learning model, in some embodiments, where different sets of federated users are selected in the respective training rounds.

A machine learning training component 211 of the local machine learning system 210 may receive the model 202 and further train the model using a local dataset 214 to generate a locally updated version of the machine learning model 202, such as the locally updated model 122 as shown in FIG. 1. To train the model with the local dataset, the local machine learning system 210 may sample the local dataset 214 into one or more subsets of the dataset, also known as mini-batches 212, using a sampling component 213. In some embodiments, a mini-batch 212 may be of a fixed batch size, with the batch size chosen for a variety of reasons in various embodiments, including, for example, computational efficiency, machine learning model convergence rate, and training accuracy. It should be understood, however, that these are merely examples and that other parameters for choosing the mini-batch size may be imagined.

In some embodiments, the locally updated version of the machine learning model 202 may generate a set of parameter updates 215. These parameter updates may then be clipped at a parameter clipping component 216 according to a global clipping threshold 204 provided by the aggregation server 200, in some embodiments. This global clipping threshold 204 may be selected by the aggregation server for a variety of reasons in various embodiments, including, for example, machine learning model convergence rate and training accuracy. It should be understood, however, that these are merely examples and that other parameters for choosing the clipping threshold may be imagined. This clipping of the parameter updates according to the provided global clipping threshold 204 may bound sensitivity of the aggregated federated learning model to the one or more parameter updates, in some embodiments.

In some embodiments, the clipped parameter updates may then have noise added by a noise injecting component 217. This noise may be calibrated according to the same global clipping threshold 204 parameter provided by the aggregation server 200 such that the noise injected is calibrated to match a privacy loss bound specified by the aggregation server in some embodiments or a privacy loss bound dictated by the local machine learning system's choice of a privacy loss (upper) bound. This privacy loss bound may enforce differential privacy guarantees for the client's local dataset without coordination of the aggregation server 200.

The combination of clipping and noise injection to the parameter updates 215 may then result in modified parameter updates 218, such as the modified parameter updates 126 as shown in FIG. 1. These modified parameter updates 218 may then be provided to the aggregation server 200 to be aggregated into aggregated parameter updates to generate an updated model, as is discussed in 114 of FIG. 1 above.

Figure 3:
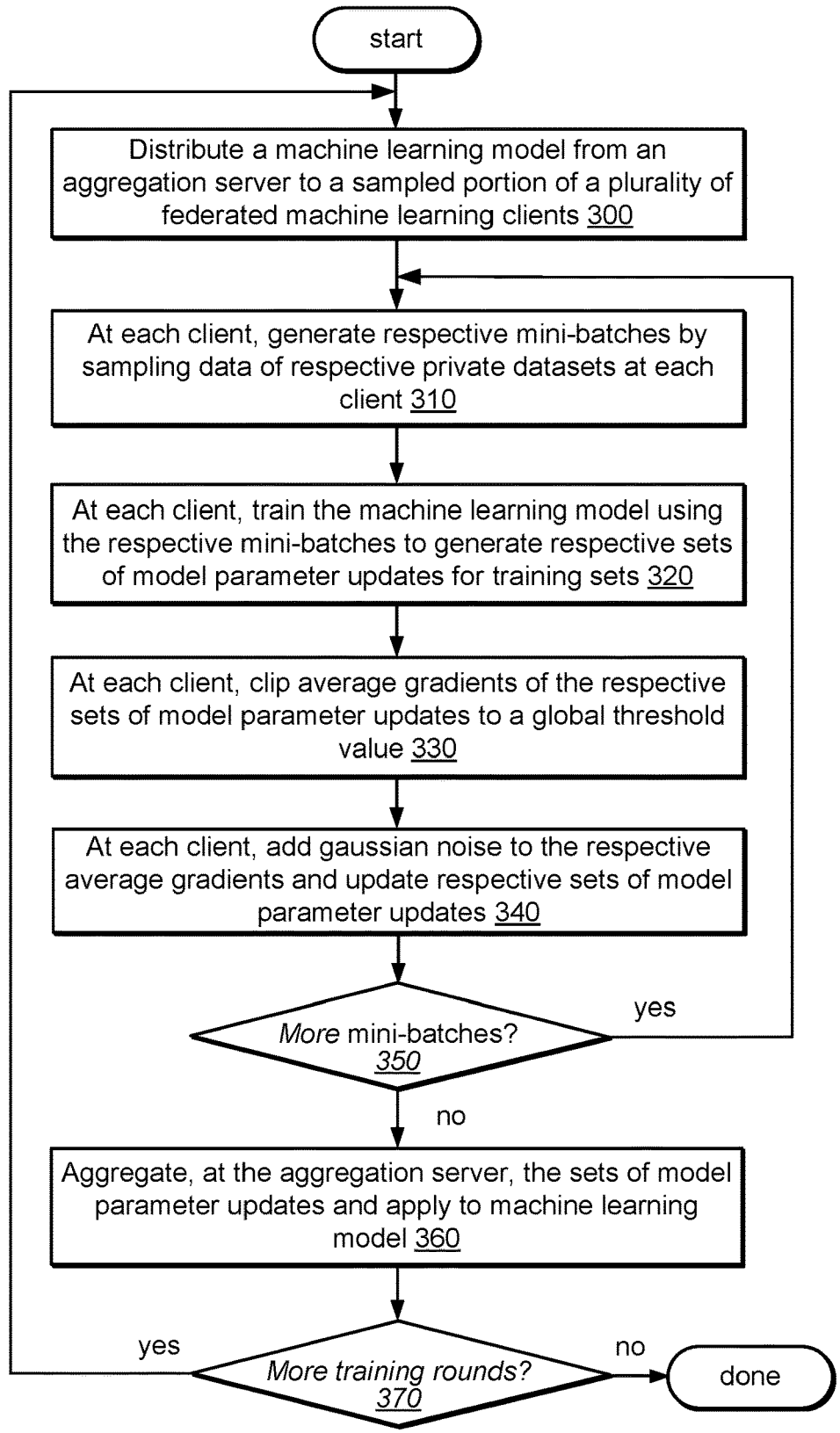
FIG. 3 is a block diagram illustrating an embodiment implementing a federated machine learning system providing user-level local Differential Privacy (DP), in various embodiments.

FIG. 3 is a block diagram illustrating an embodiment implementing a federated machine learning system providing user-level local DP, in various embodiments. Embodiments of FIG. 3 may implement the following pseudo code:

```
UserLocalDPSGD(u_i):
    for t = 1 to T do
        S = random sample of B data items from D_i
        g(S) = ∇ L(θ, S)            // Compute gradient
        ġ(S) = g(S) / max(1, ||g(S)||_2/C)   // Clip gradient
        ġ(S) = ġ(S) + N(O, u²C²I)   // Add gaussian noise
        θ = θ − ηġ(S)
    end
    return θ
Server Loop:
    for r = 1 to R do
        U_s = sample s users from U
        for u_i ∈ U_s do
            θ_i = UserLocalDPSGD(u_i)
        end
        θ = (1 / s) Σ^s_{i=1} θ_i
        send M to all users in U
```

-continued

```
    end
For:
    Set of n users U = u_1, u_2, ..., u_n
    D_i the dataset of user u_i
    M the model to be trained
    θ the parameters of model M
    noise scale u
    gradient norm bound C
    sample of users U_s
    mini-batch size B
    R training rounds
    T batches per round
    learning rate η
```

On receiving a request to re-train model parameters, each user may train using mini-batches, such as the mini-batches 212 of FIG. 2, and Stochastic Gradient Descent (SGD). For each randomly selected mini-batch, the user may compute parameter gradients averaged over the mini-batch and then clip the gradients, such as described 216 of FIG. 2, to a globally prescribed threshold C, such as the global clipping threshold 204 of FIG. 2. The user may then add noise from the Gaussian distribution, such as in the noise injecting component 217 of FIG. 2, where u is the noise scale computed using the moments accountant method with the globally specified parameters of ε, δ, number of training rounds R, locally determined number of mini-batches T per training round, and the local sampling fraction q of the mini-batches.

The process begins at step 300 where a current version of a machine learning model may be distributed from an aggregation server to a sampled portion of a plurality of clients, such as the model 112 shown in FIG. 1, in some embodiments. Once the model is distributed, as shown in 310, individual clients may generate respective mini-batches, such as the mini-batches 212 of FIG. 2, by sampling data of respective datasets private to the respective clients, in some embodiments.

Individual clients may then train the machine learning model, such as the model 122 shown in FIG. 1, using the respective sampled mini-batches to generate respective sets of model parameter updates, such as the model parameter updates 126 of in FIG. 1, as shown in 320, in some embodiments. The clients may then clip average gradients of the respective sets of model parameter updates to a global threshold value, such as the global clipping threshold 204 of FIG. 2, as shown in 330, in some embodiments.

The clients may then add gaussian noise, such as shown in the noise injecting component 217 of FIG. 2, to the respective average gradients and update the respective sets of model parameter updates, such as the model 128 of in FIG. 1, as shown in 340, in some embodiments. If individual clients determine that more mini-batches are needed, as shown in a positive exit from 350, the process may, for those clients, then return to step 310. If more mini-batches are not needed for a client, as shown in a negative exit from 350, the process for that client may then proceed to step 360 where the aggregation server may aggregate the sets of model parameter updates from the respective clients, such as the aggregated model parameter updates 114 shown in FIG. 1, and apply the aggregated parameter updates to the machine learning model to generate a new version of the machine learning model.

If the aggregation server determines that more training rounds are needed, such as determined by model convergence or by a number of rounds completed compared to a threshold number of rounds, as shown in a positive exit from 370, the aggregation server may select a new set of federation users, such as by using the user selection component 206 as shown in FIG. 2, and the process may then return to step 300. If more training rounds are not needed, as shown in a negative exit from 370, the process is then complete.

Figure 4:
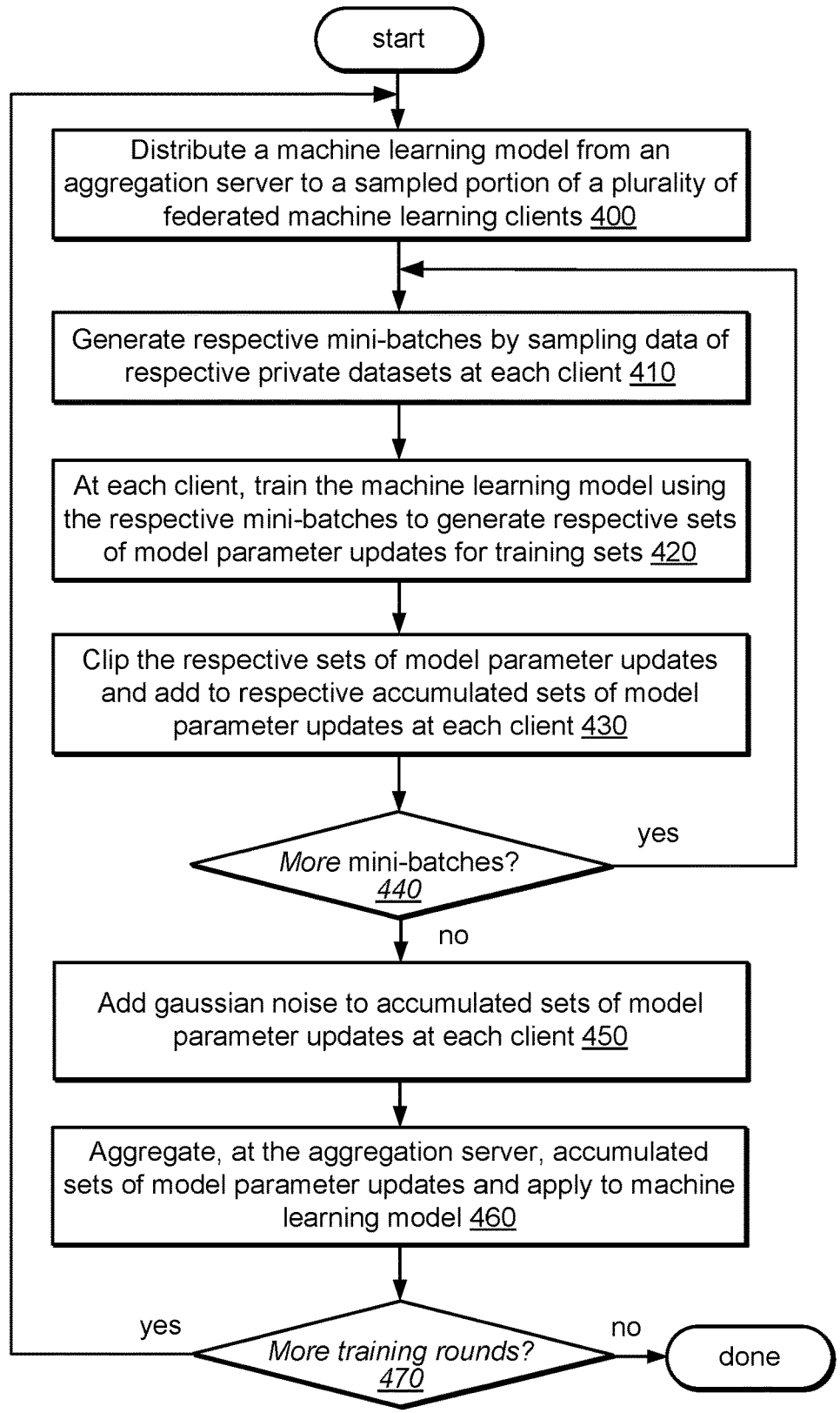
FIG. 4 is a block diagram illustrating another embodiment implementing a federated machine learning system providing user-level privacy, in various embodiments.

FIG. 4 is a block diagram illustrating another embodiment implementing a federated machine learning system providing user-level privacy, in various embodiments. Embodiments of FIG. 4 may implement the following pseudo code:

```
UserLocalOutPerturb(ui, θ⁰):
    for t = 1 to T do
        S = random sample of B data items from D_i
        θ = θ − η∇L(θ, S)              // Update parameters
        θ = θ⁰ + (θ − θ⁰) / max(1, ‖θ − θ⁰‖2/C) // Clip parameter updates
    end
    Δ = θ − θ⁰ + N(O, u²C²I)            // Add gaussian noise
    return Δ
Server Loop:
    for r = 1 to R do
        U_s = sample s users from U
        for u_i ∈ U_s do
            Δ_i = UserLocalOutPerturb(u_i, θ)
        end
        θ = θ + (1 / s) Σ^s_{i=1} Δ_i
        send M to all users in U
    end
For:
    Set of n users U = u_1, u_2, ..., u_n
    D_i the dataset of user u_i
    M the model to be trained
    θ the parameters of model M
    noise scale u
    gradient norm bound C
    sample of users U_s
    mini-batch size B
    R training rounds
    T batches per round
    learning rate η
```

On receipt of a request for re-training, each user uses SGD to retrain the model on its private dataset by sampling mini-batches, such as the mini-batches 212 of FIG. 2, from the dataset. At the end of the training round, the user may add noise, such as in the noise injecting component 217 of FIG. 2, from the normal distribution N(O, u²C²I) to the parameter updates. The noise may be scaled to maximum contribution (sensitivity) from each user. The perturbation may be proportionate to the entire signal coming from each user.

The process begins at step 400 where a current version of a machine learning model may be distributed from an aggregation server to a sampled portion of a plurality of clients, such as the model 112 shown in FIG. 1, in some embodiments. Once the model is distributed, as shown in 410, individual clients may generate respective mini-batches, such as the mini-batches 212 of FIG. 2, by sampling data of respective datasets private to the respective clients, in some embodiments.

Individual clients may then train the machine learning model, such as the model 122 shown in FIG. 1, using the respective sampled mini-batches to generate respective sets of model parameter updates, such as the model parameter updates 126 of in FIG. 1, as shown in 420, in some embodiments. The clients may then clip the respective sets of model parameter updates, such as by using the parameter clipping component 216 of FIG. 2, and add the clipped updates to respective sets of accumulated model parameter updates, as shown in 430, in some embodiments.

If the aggregation server determines that more mini-batches are needed, as shown in a positive exit from 440, the process may then return to step 410. If more mini-batches are not needed, as shown in a negative exit from 440, the process may then proceed to step 450 where the clients may then add gaussian noise such as by using the noise injecting component 217 of FIG. 2, to the respective accumulated sets of model parameter updates, such as the model 128 of in FIG. 1, in some embodiments.

The aggregation server may aggregate the sets of model parameter updates from the respective clients, such as the aggregated model parameter updates 114 shown in FIG. 1, and apply the aggregated parameter updates to the machine learning model to generate a new version of the machine learning model, as shown in 460.

If the aggregation server determines that more training rounds are needed, such as determined by model convergence or by a number of rounds completed compared to a threshold number of rounds, as shown in a positive exit from 470, the aggregation server may select a new set of federation users, such as by using the user selection component 206 as shown in FIG. 2, and the process may then return to step 400. If more training rounds are not needed, as shown in a negative exit from 470, the process is then complete.

Some of the mechanisms described herein may be provided as a computer program product, or software, that may include a non-transitory, computer-readable storage medium having stored thereon instructions which may be used to program a computer system 1200 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1200 may include one or more processors 1210; each may include multiple cores, any of which may be single- or multi-threaded. For example, multiple processor cores may be included in a single processor chip (e.g., a single processor 1210), and multiple processor chips may be included in computer system 1200. Each of the processors 1210 may include a cache or a hierarchy of caches (not shown) in various embodiments. For example, each processor chip 1210 may include multiple L1 caches (e.g., one per processor core) and one or more other caches (which may be shared by the processor cores on a single processor).

The computer system 1200 may also include one or more storage devices 1270 (e.g. optical storage, magnetic storage, hard drive, tape drive, solid state memory, etc.) and a memory subsystem 1220. The memory subsystem 1220 may further include one or more memories (e.g., one or more of cache, SRAM, DRAM, RDRAM, EDO RAM, DDR RAM, SDRAM, Rambus RAM, EEPROM, etc.). In some embodiments, one or more of the storage device(s) 1270 may be implemented as a module on a memory bus (e.g., on I/O interface 1230) that is similar in form and/or function to a single in-line memory module (SIMM) or to a dual in-line memory module (DIMM). Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.)

The one or more processors 1210, the storage device(s) 1270, and the memory subsystem 1220 may be coupled to the I/O interface 1230. The memory subsystem 1220 may contain application data 1224 and program code 1223. Application data 1224 may contain various data structures while program code 1223 may be executable to implement one or more applications, shared libraries, and/or operating systems.

Program instructions 1225 may be encoded in a platform native binary, any interpreted language such as Java' bytecode, or in any other language such as C/C++, the Java™ programming language, etc., or in any combination thereof. In various embodiments, applications, operating systems, and/or shared libraries may each be implemented in any of various programming languages or methods. For example, in one embodiment, operating system may be based on the Java™ programming language, while in other embodiments it may be written using the C or C++ programming languages. Similarly, applications may be written using the Java™ programming language, C, C++, or another programming language, according to various embodiments. Moreover, in some embodiments, applications, operating system, and/shared libraries may not be implemented using the same programming language. For example, applications may be C++ based, while shared libraries may be developed using C.

What is claimed is:

1. A computer-implemented method, comprising:
    performing a plurality of training rounds of a federated machine learning system, wherein a training round of the plurality of training rounds comprises:
        receiving, at a portion of a plurality of clients of the federated machine learning system, a federated learning model from an aggregation server of the federated machine learning system, the federated learning model comprising one or more training updates from a previous training round of the plurality of training rounds;
        performing at respective clients of the portion of the plurality of clients:
            training the received machine learning model using a dataset private to the respective client to generate one or more parameter updates;
            applying a respective gradient to individual ones of the one or more parameter updates, the respective gradient determined by modifying an average gradient, computed based at least in part on at least a portion of the private dataset, by a noise value scaled to provide a local differential privacy guarantee for the respective client; and
            sending the one or more parameter updates to the aggregation server;
        collecting, at the aggregation server, the respective parameter updates from the portion of the plurality of clients; and
        revising the federated learning model according to an aggregation of the respective received parameter updates of the portion of the plurality of clients.

2. The computer-implemented method of claim 1, wherein the average gradient is clipped by a global threshold, and wherein the noise value is determined according to a gaussian distribution.

3. The computer-implemented method of claim 1, wherein the applying of the respective noise values to the individual ones of the one or more parameter updates comprises:
    clipping the individual ones of the one or more parameter updates by a global threshold; and
    modifying the individual ones of the one or more parameter updates by a noise value determined according to a gaussian distribution.

4. The computer-implemented method of claim 1, wherein the applying of the respective noise values to the individual ones of the one or more parameter updates comprises determining a noise value proportional to:
    a privacy loss bound received from the aggregation server; or
    a privacy loss bound determined the respective client.

5. The computer-implemented method of claim 1, wherein applying the respective noise values to individual ones of the one or more parameter updates provides differential privacy for the private dataset of the respective client.

6. The computer-implemented method of claim 1, wherein the receiving, performing, training, applying, sending, collecting and revising are performed for a single training round of a plurality of training rounds of the federated machine learning system, and wherein individual ones of the plurality of training rounds use different portions of the plurality of clients.

7. The computer-implemented method of claim 1, wherein training the received machine learning model comprises using a mini-batch of the dataset private to the respective client to generate the one or more parameter updates.

8. A system, comprising:
    a plurality of clients of a federated machine learning system respectively comprising at least a processor and memory, wherein individual clients of at least a portion of the plurality of clients are configured to perform a plurality of training rounds of the federated machine learning system, wherein to perform a training round of the plurality of training rounds the plurality of clients are individually configured to:
        receive a federated learning model from an aggregation server of the federated machine learning system, the federated learning model comprising one or more training updates from a previous training round of the plurality of training rounds;
        train the received machine learning model using a private dataset to generate one or more parameter updates; and
        apply a respective gradient to individual ones of the one or more parameter updates, the respective gradient determined by modifying an average gradient, computed based at least in part on at least a portion of the private dataset, by a noise value scaled to provide a local differential privacy guarantee for the respective client; and
        send the one or more parameter updates to the aggregation server;
    the aggregation server of the federated machine learning system, wherein for individual training rounds of the plurality of training rounds the aggregation server is configured to:
        collect the respective parameter updates from the individual clients of the portion of the plurality of clients; and revise the federated learning model according to an aggregation of the respective received parameter updates.

9. The system of claim 8, wherein the average gradient is clipped by a global threshold, and wherein the noise value is determined according to a gaussian distribution.

10. The system of claim 8, wherein to apply the respective noise values to the individual ones of the one or more parameter updates, the individual clients of the portion of the plurality of clients are configured to:
   clip the individual ones of the one or more parameter updates by a global threshold; and
   modify the individual ones of the one or more parameter updates by a noise value determined according to a gaussian distribution.

11. The system of claim 8, wherein to apply the respective noise values to the individual ones of the one or more parameter updates, the individual clients of the portion of the plurality of clients are configured to: determine a noise value proportional to a global threshold received from the aggregation server, the global threshold bounding sensitivity of the federated learning model to the one or more parameter updates.

12. The system of claim 8, wherein the respective noise values are applied to individual ones of the one or more parameter updates to provide differential privacy for the private dataset of the respective client.

13. The system of claim 8, wherein the receiving, performing, training, applying, sending, collecting and revising are performed for a single training round of a plurality of training rounds of the federated machine learning system, and wherein the federated machine learning system is configured to use different portions of the plurality of clients for respective rounds of the plurality of training rounds.

14. The system of claim 8, wherein to train the received machine learning model the portion of the individual clients of the plurality of clients are configured to train the received machine learning model using a mini-batch of the dataset private to the respective client to generate the one or more parameter updates.

15. One or more non-transitory computer-accessible storage media storing program instructions that when executed on or across one or more computing devices cause the one or more computing devices to perform:
   executing a plurality of training rounds of a federated machine learning system, wherein a training round of the plurality of training rounds comprises:
   receiving, at a client of a plurality of clients of a federated machine learning system, a federated learning model from an aggregation server of the federated machine learning system, the federated learning model comprising one or more training updates from a previous training round of the plurality of training rounds; and
   performing at the client:
   training the received machine learning model using a dataset private to the respective client to generate one or more parameter updates;
   applying a respective gradient to individual ones of the one or more parameter updates, the respective gradient determined by modifying an average gradient, computed based at least in part on at least a portion of the private dataset, by a noise value scaled to provide a local differential privacy guarantee for the respective client; and
   sending the one or more parameter updates to the aggregation server to revise the federated learning model according to an aggregation of the respective received parameter updates of the plurality of clients.

16. The one or more non-transitory computer-accessible storage media of claim 15, wherein the average gradient is clipped by a global threshold, and wherein the noise value is determined according to a gaussian distribution.

17. The one or more non-transitory computer-accessible storage media of claim 15 storing additional program instructions that when executed on or across the one or more computing devices cause the one or more computing devices to perform:
   clipping the individual ones of the one or more parameter updates by a global threshold; and
   modifying the individual ones of the one or more parameter updates by a noise value determined according to a gaussian distribution.

18. The one or more non-transitory computer-accessible storage media of claim 15 storing additional program instructions that when executed on or across the one or more computing devices cause the one or more computing devices to perform determining a noise value proportional to a global threshold received from the aggregation server, the global threshold bounding sensitivity of the federated learning model to the one or more parameter updates.

19. The one or more non-transitory computer-accessible storage media of claim 15, wherein applying the respective noise values to individual ones of the one or more parameter updates provides differential privacy for the private dataset of the respective client.

20. The one or more non-transitory computer-accessible storage media of claim 15, wherein training the received machine learning model comprises using a mini-batch of the dataset private to the respective client to generate the one or more parameter updates.

* * * * *